(12) United States Patent
Irving

(10) Patent No.: US 10,077,675 B2
(45) Date of Patent: Sep. 18, 2018

(54) FLUID SYSTEM

(71) Applicant: ROLLS-ROYCE plc, London (GB)

(72) Inventor: Robert John Irving, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 15/272,768

(22) Filed: Sep. 22, 2016

(65) Prior Publication Data

US 2017/0226890 A1 Aug. 10, 2017

(30) Foreign Application Priority Data

Oct. 20, 2015 (GB) .................................. 1518573.9

(51) Int. Cl.
| | | |
|---|---|---|
| *B08B 5/02* | (2006.01) | |
| *B64D 13/00* | (2006.01) | |
| *F01D 25/00* | (2006.01) | |
| *F02C 7/04* | (2006.01) | |
| *F01D 25/12* | (2006.01) | |
| *F02C 7/18* | (2006.01) | |
| *B64D 33/08* | (2006.01) | |
| *F02C 6/08* | (2006.01) | |
| *B64D 33/02* | (2006.01) | |

(52) U.S. Cl.
CPC .............. *F01D 25/002* (2013.01); *B08B 5/02* (2013.01); *B64D 13/00* (2013.01); *B64D 33/08* (2013.01); *F01D 25/12* (2013.01); *F02C 6/08* (2013.01); *F02C 7/04* (2013.01); *F02C 7/18* (2013.01); *B64D 2033/024* (2013.01); *B64D 2241/00* (2013.01); *F05D 2250/18* (2013.01); *Y02T 50/675* (2013.01); *Y10T 137/0536* (2015.04)

(58) Field of Classification Search
CPC ...... B08B 5/02; B64D 13/00; B64D 2241/00; F01D 25/002; F02C 7/04; Y10T 137/0536
USPC ........... 134/123; 137/15.1; 244/53 B; 454/76
See application file for complete search history.

(56) References Cited

U.S. PATENT DOCUMENTS

2006/0102779 A1* 5/2006 Campbell .............. B64D 41/00
244/53 B
2010/0126182 A1 5/2010 Hoover et al.

FOREIGN PATENT DOCUMENTS

| CN | 102817716 A | 12/2012 |
|---|---|---|
| EP | 1916185 A2 | 4/2008 |
| EP | 2868580 A1 | 5/2015 |

(Continued)

OTHER PUBLICATIONS

Mar. 3, 2017 Search Report issued in European Patent Application No. 16 19 0082.

(Continued)

*Primary Examiner* — Levon J Shahinian
(74) *Attorney, Agent, or Firm* — Oliff PLC

(57) ABSTRACT

A fluid system comprising a surface that is fluid washed in use by a fluid flow travelling substantially parallel to the surface is disclosed. The system has a first port through the surface and a second port through the surface, the first and second ports having respective first and second port inlets that are substantially flush with the fluid washed surface. The first and second port inlets are stacked in a direction parallel to the normal flow of fluid over the fluid washed surface such that the first port is upstream of the second port and fluid travelling closer to the fluid-washed surface entering into the first port tends to entrain fluid travelling further from the fluid-washed surface for entry into the second port.

13 Claims, 2 Drawing Sheets

(56) References Cited

FOREIGN PATENT DOCUMENTS

| | | | |
|---|---|---|---|
| GB | 2419640 | A | 5/2006 |
| GB | 2442310 | A | 4/2008 |
| WO | 03/037715 | A1 | 5/2003 |
| WO | 2006/091138 | A1 | 8/2006 |
| WO | 2009/156120 | A2 | 12/2009 |

OTHER PUBLICATIONS

Mar. 18, 2016 Search Report issued in British Patent Application No. 1518573.9.

* cited by examiner

FLUID SYSTEM

The present disclosure concerns a fluid system. More specifically the disclosure concerns fluid systems that capture fluid via a port inlet passing through a surface. The disclosure also concerns gas turbine engines and aircraft comprising such systems.

It is well known to capture and divert fluid that is flowing (for example) in a duct or over a cowling. Such capture may occur at a surface of the duct or cowling via a port (e.g. intake, bleed, bifurcation or similar). Where such a port has a port intake which is substantially flush with the surface, it may be that the port causes comparably little disruption to the fluid flow and or causes little if any increase in drag. Furthermore such a flush port inlet may be relatively mechanically simple and lightweight. Disadvantageously however the port may be more likely to capture a boundary layer of fluid travelling adjacent the surface. Such boundary layer fluid may have disadvantageous properties with respect to a desired use of the captured fluid (e.g. in terms of temperature, static pressure and/or turbulence).

One way to capture fluid that is flowing further from the surface is to provide a scoop, mast or similar to increase the distance of the port intake from the surface. Such a scoop or mast will likely however increase drag, disruption to the fluid flow, weight and complexity by comparison with a substantially flush port intake.

According to a first aspect there is provided a fluid system comprising a surface that is fluid washed in use by a fluid flow travelling substantially parallel to the surface, a first port through the surface and a second port through the surface, the first and second ports having respective first and second port inlets that are substantially flush with the fluid washed surface, the first and second port inlets being stacked in a direction parallel to the normal flow of fluid over the fluid washed surface such that the first port is upstream of the second port and fluid travelling closer to the fluid-washed surface entering into the first port tends to entrain fluid travelling further from the fluid-washed surface for entry into the second port.

The first port inlet may be considered to mask the second port inlet from a fluid flowing adjacent the surface (which may be a boundary layer), the first port tending to capture fluid travelling nearest to the surface, necessitating that fluid entering the second port tends to have been flowing further from the surface. In this way the fluid entering the two ports may have different properties despite the proximity of the first and second port inlets. In particular the first port may tend to capture boundary layer fluid whereas the second port may tend to capture non-boundary layer fluid.

In some embodiments the first and second port inlets are immediately adjacent one another. It may be that the strength of the entrainment is increased with reduced distance between the port inlets.

In some embodiments the first and second ports are separated by a common wall. A common wall may be a convenient means of separating the two ports where the ports are adjacent one another.

In some embodiments the second port inlet has a smaller cross-sectional area than the first port inlet. Where the port inlets are arranged such that the downstream port is smaller than the upstream port, the system may work more efficiently in terms of entraining flow into the downstream port.

In some embodiments the first and second port inlets share a common axis of symmetry that is substantially parallel to the normal flow direction of fluid over the fluid washed surface. With the port inlets stacked in a linear fashion with respect to the normal fluid flow direction, the system may work more efficiently in terms of entraining flow into the second port.

In some embodiments the second port inlet is narrower than the first port inlet in a direction perpendicular to the normal flow direction of fluid over the fluid washed surface. Where the port inlets are arranged such that the downstream port is narrower than the upstream port, the system may work more efficiently in terms of entraining flow into the downstream port.

In some embodiments respective first and second conduits extend from the first and second ports for transporting fluid captured by the first and second port inlets for respective first and second different uses. Specifically the first conduit may only transport fluid captured by the first port and/or the second conduit may only transport fluid captured by the second port. The first and second conduits could deliver fluid to different components and/or systems. Assuming that the fluid captured by the first and second ports is of differing quality (e.g. having different temperature, pressure and/or turbulence) delivery of fluid captured by the different ports for different uses may be advantageous. By way of example one component/system to which fluid is to be delivered for use therein may be more tolerant of lower quality fluid than another. Additionally or alternatively such a component/system may be considered more critical than another and may therefore take priority in terms of the quality of fluid delivered thereto.

In some embodiments the second use benefits from a lower temperature and/or higher pressure and/or less turbulent flow being captured by the second port inlet than is captured by the first port inlet for the first use. Fluid travelling further from the surface and captured by the second port may be more likely to have lower temperature, higher recovered pressure and/or lower turbulence and so it may be advantageous to deliver this fluid for the use (e.g. in a system or component) requiring or at least benefiting most from such fluid.

In some embodiments the surface is arranged for use in a gas turbine engine and/or in a vehicle. The vehicle may for instance be an aircraft. The surface may for instance be a surface of a bypass duct for use in a gas turbine engine or an external surface of a nacelle for use in a gas turbine engine. Alternatively the surface may be a portion of the fuselage of an aircraft.

Each of the first and second uses may be any of oil, fuel or hydraulic fluid cooling, cooling of a turbine case, cooling a higher pressure fluid flow, zone ventilation, bearing chamber sealing or alterative component cooling. In a particular embodiment the first use is cooling of a turbine casing of the gas turbine engine and the second use is cooling a higher pressure fluid flow. Specifically the first conduit may deliver fluid for use in a turbine case cooling system and the second conduit may deliver fluid for use in a cooled cooling air system.

In some embodiments the fluid washing the surface in use is gas. The fluid may for example be air.

In some embodiments one or more additional ports each having a port inlet forming part of the stacked arrangement previously described may be provided. Such additional ports may be capable of capturing fluid from still further away from the surface than the second port, such captured fluid potentially being better suited to yet another alternative use. Additionally or alternatively the additional ports may allow for capture of a greater volume of fluid similar to that captured and optionally for the same use as by the second port, whilst maintaining reduction in consecutive port inlet widths perpendicular to the normal flow direction of fluid over the fluid washed surface. As will be appreciated any of the features described above with respect to the first and/or second ports may be applied mutatis mutandis to the one or more additional ports, individually and/or in combination with the first and/or second and/or other additional ports as appropriate.

According to a second aspect there is provided a gas turbine engine comprising a fluid system in accordance with the first aspect.

According to a third aspect there is provided an aircraft comprising a fluid system in accordance with the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

Embodiments will now be described by way of example only, with reference to the Figures, in which.

Figure 1:
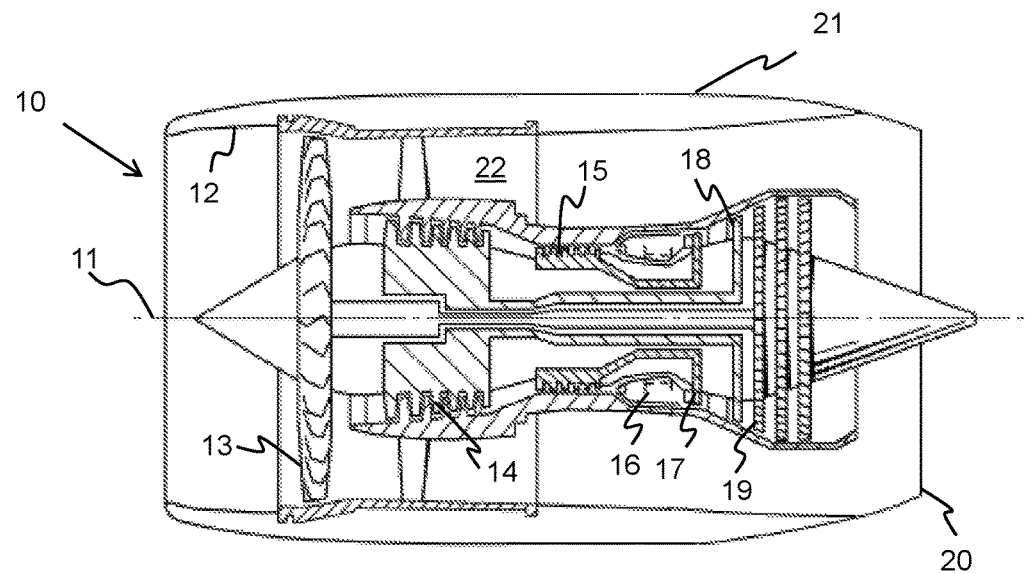
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

Figure 2:
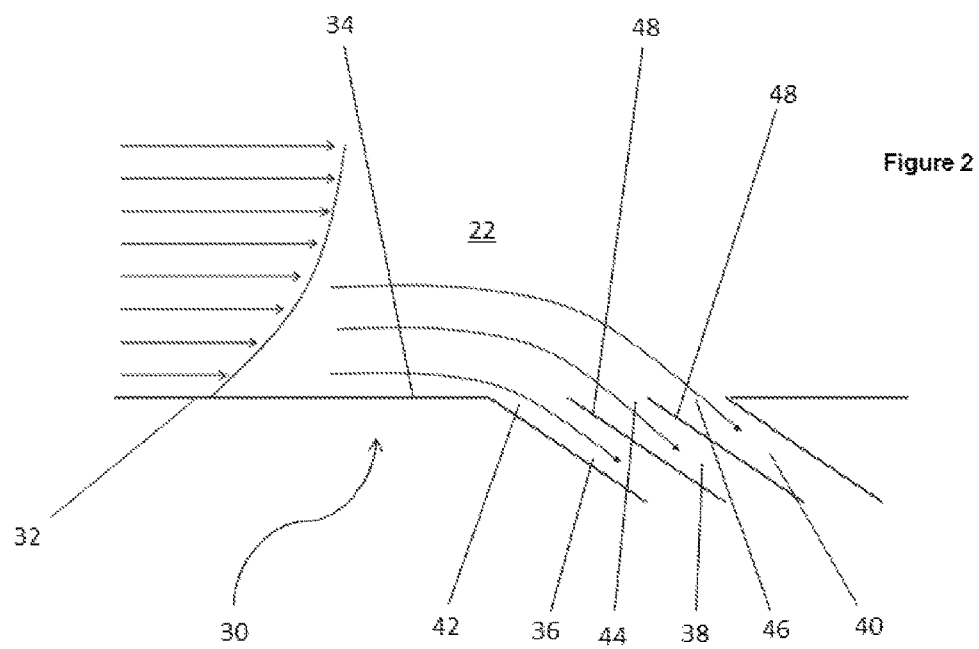
FIG. 2 is a cross sectional view of part of a fluid system in accordance with an embodiment of the invention.
Figure 3:
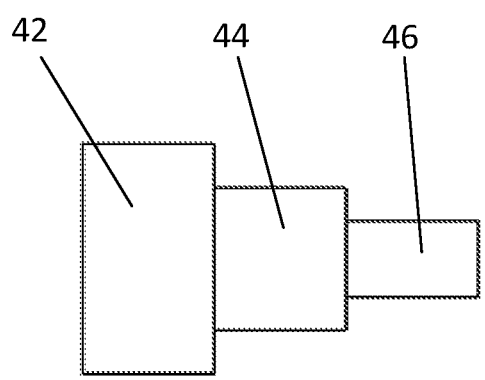
FIG. 3 is a plan view of first, second and third port inlets in accordance with embodiments of the invention.

Referring now to FIGS. 2 and 3 part of a fluid system is generally provided at 30. The fluid system 30 comprises an inner wall 32 of the bypass duct 22 having a surface 34. Passing through the surface 34 are a first 36, second 38 and third 40 ports. The ports 36, 38, 40 have respective first 42, second 44 and third 46 port inlets which are flush with the surface 34. The first 36 and second 38 ports and the second 38 and third 40 ports are separated by respective common walls 48. The ports 36, 38, 40 are canted at an oblique angle to the surface 34 such that air entering the ports 36, 38, 40 from the second airflow turns through less than 90°.

Respective first, second and third conduits (not shown) extend from the first 36, second 38 and third 40 ports, fluidly connecting the ports to respective distinct systems. Specifically the first conduit connects the first port 36 to a turbine case cooling system (not shown) of the gas turbine engine 10 and the second and third conduits connect the second 38 and third 40 ports respectively to a cooled cooling air system (not shown) of the gas turbine engine 10. The turbine case cooling system uses the air delivered from the first port 36 for controlling a turbine case temperature. The cooled cooling air system uses the air delivered from the second 38 and third 40 ports for cooling higher pressure air which is itself then used for cooling of nozzle guide vanes of the gas turbine engine 10.

When in use the surface 34 is air-washed by the second air flow passing through the bypass duct 22. The second airflow travels substantially parallel to the surface 34. The first 36, second 38 and third 40 ports are stacked one after the other with respect to the second airflow, with the first port 36 being furthest upstream, the third port 40 being furthest downstream and the second port 38 being between the two. Each port 36, 38, 40 is positioned immediately adjacent its neighbouring port(s). Further and as can be seen with reference to FIG. 3, each port inlet 42, 44, 46 is narrower than the last from the upstream to the downstream direction. The length of each port inlet 42, 44, 46 is greater than the last from the upstream to the downstream direction, compensating somewhat for the reduction in cross-sectional area caused by the reduction in width. Nonetheless the cross-sectional area still decreases by comparison with the previous port from the upstream to the downstream direction. The port inlets 42, 44, 46 also have a common axis of symmetry that is parallel to the flow direction of the second airflow such that the port inlets 42, 44, 46 are aligned.

In use the fluid system 30 supplies bypass duct air to the turbine case cooling system and the cooled cooling air system The second airflow travels along the bypass duct 22. As it does so a boundary layer is formed adjacent the surface 34. The boundary layer air has a higher temperature, lower pressure and greater turbulence than the main body of the second airflow. At the first port inlet 42 the majority of the boundary layer is captured and travels into the first port 36, through the first conduit and to the turbine case cooling system. For the turbine case cooling system mass flow of the air delivered may be more significant than delivery pressure and/or temperature. With the boundary layer having been largely captured, air flowing into the second port inlet 44 is drawn from further away from the surface 34 and indeed is entrained by the boundary layer flowing into the first port inlet 42. The air captured by the second port inlet 42 is therefore cooler, of higher pressure and is less turbulent than the air captured by the first port inlet 42. The air captured by the second port inlet 45 travels into the second port 38, through the second conduit and to the cooled cooling air system. Reduced temperature and increased pressure of the air delivered to the cooled cooling air system may be particularly advantageous. As will be appreciated air flowing into the third port inlet 46 is drawn from still further from the surface 34 and may therefore have still lower temperature, higher pressure and lower turbulence than the air captured by the second port. The air captured by the third port inlet 46 travels into the third port 40, through the third conduit and to the cooled cooling air system.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A fluid system, comprising:
   a surface that is fluid washed in use by a fluid flow travelling substantially parallel to the surface;
   a first port through the surface;
   a second port through the surface; and
   a third port through the surface,
   wherein the first, second and third ports have respective first, second and third port inlets that are substantially flush with the fluid washed surface,
   wherein the first, second and third port inlets are stacked in a direction parallel to a normal flow of fluid over the fluid washed surface such that the first port is upstream of the second port and the second port is upstream of the third port,
   wherein the second port inlet is narrower than the first port inlet in a direction perpendicular to the normal flow of fluid over the fluid washed surface, and wherein the third port inlet is narrower than the second port inlet in the direction perpendicular to the normal flow of fluid over the fluid washed surface.

2. The fluid system according to claim 1, wherein the first and second port inlets are immediately adjacent one another.

3. The fluid system according to claim 1, wherein the first and second ports are separated by a common wall.

4. The fluid system according to claim 1, wherein the second port inlet has a smaller cross-sectional area than the first port inlet.

5. The fluid system according to claim 1, wherein the first and second port inlets share a common axis of symmetry that is substantially parallel to the normal flow of fluid over the fluid washed surface.

6. The fluid system according to claim 1, wherein respective first and second conduits extend from the first and second ports for transporting fluid captured by the first and second port inlets for respective first and second different uses.

7. The fluid system according to claim 6, wherein the second use benefits from a lower temperature and/or higher pressure and/or less turbulent flow being captured by the second port inlet than is captured by the first port inlet for the first use.

8. The fluid system according to claim 1, wherein the surface is arranged for use in a gas turbine engine.

9. The fluid system according to claim 1, wherein the surface is arranged for use as a surface of a bypass duct of a gas turbine engine.

10. The fluid system according to claim 1, wherein the surface is arranged for use in a vehicle.

11. The fluid system according to claim 1, wherein the fluid washing the surface in use is gas.

12. A gas turbine engine comprising the fluid system in accordance with claim 1.

13. An aircraft comprising the fluid system in accordance with claim 1.

* * * * *